R. P. BIRDWELL.
CUTTER HEAD AND BIT.
APPLICATION FILED MAR. 19, 1909.
930,929.
Patented Aug. 10, 1909.
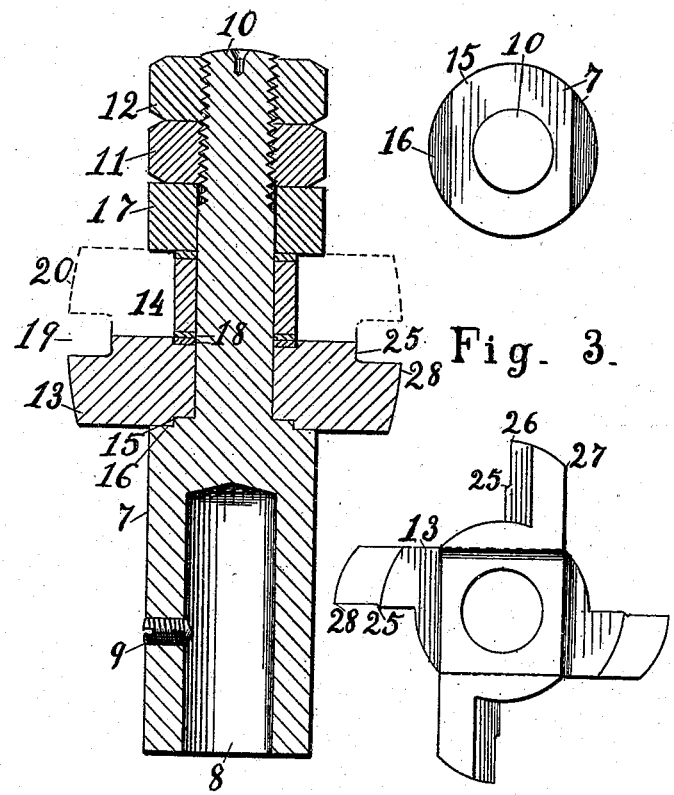
Witness  
N. S. Waller.  
E. Gray.
Inventor  
Robert P. Birdwell,  
by W. X. Stevens.  
Attorney ated Aug. 10, 1909.

UNITED STATES PATENT OFFICE.

ROBERT P. BIRDWELL, OF BROWNSBORO, TEXAS, ASSIGNOR OF ONE-HALF TO WILLIAM D. INGRAM, OF BROWNSBORO, TEXAS.

CUTTER-HEAD AND BIT.

No. 930,929.     Specification of Letters Patent.     Patented Aug. 10, 1909.

Application filed March 19, 1909. Serial No. 484,494.

*To all whom it may concern:*

Be it known that I, ROBERT P. BIRDWELL, a citizen of the United States, residing at Brownsboro, in the county of Henderson and State of Texas, have invented certain new and useful Improvements in Cutter-Heads and Bits, of which the following is a specification.

This invention relates in general to that class of woodworking machinery which may be generally termed planers, and includes machines for surfacing, jointing, tongue-and-grooving, frizzing etc., and the object of the invention is to provide a cutter head and means for securing cutters or bits thereto, which shall be light, simple, inexpensive, easily kept in working order, quickly adjusted for work, and always in perfect balance for all speeds.

To this end my invention consists in the construction and combination of parts forming a woodworking cutter-head and bits, hereinafter more fully described and particularly set forth in the claims, reference being had to the accompanying drawings in which—

Figure 1, represents in vertical section, a cutter-head and bits according to my invention, for forming tongues upon the edges of boards for tongue-and-groove matching. Fig. 2, is a top end view of the cutter-head. Fig. 3, is a top face view of a pair of cutters. Fig. 4, is a side view of a modification of the cutter-head. Fig. 5, shows, in section, a pair of grooving cutters laid parallel with each other.

Numeral 7, represents the body of the cutter-head, bored at 8, to fit upon a machine spindle, and having a binding screw, 9, to hold it rigidly thereon. This cutter-head is provided with a spindle 10, which is screw-threaded nearly its whole length and is long enough to receive upon it any gang of cutters which it is adapted to carry, and beyond those cutters to receive a binding nut 11, and a jam nut 12.

The cutters 13, 14 represented in the drawing, are of the form which is adapted to shape the tongue edge of boards for matching. The cutter 13, which is the first to be placed on the spindle 10, is gained across its back to receive a boss 15, projecting from the shoulder 16, of the body 7. The cutter is engaged by this boss 15, as a screw is engaged by a screwdriver, and is thereby forced to rotate with the head. The two cutters 13 and 14, are both gained across their adjacent faces to fit together as shown in Fig. 3, so that when the cutter 13, is rotated by the cutter-head, it will force the cutter 14, to rotate with it. The gains for the cutter joints fit also upon the boss 15. A ring 17, is interposed between the cutter 14, and the binding nut 11, merely to fill up the spindle. Washers 18, may be inserted between the two cutters to spread them far enough apart to make the space 19, as wide as the thickness of tongue required on the board; the dotted lines 20, showing the position that cutter 14, will take in rotating.

If the pair of grooving cutters 21, 22, were crossed and pressed together the blades would both rotate in the same circular path and the groove made would be only the width of one of the blades. That would be the narrowest groove these cutters could make, but by inserting washers as at 18, they can be separated so they would make grooves ranging from the width of one to the width of both cutters. If the projecting portions 25, of the cutters 13, 14, be as wide as the tongues 23, 24, they may be set to make tongues to match any width of grooves made by cutter tongues 23, 24. Cutters thus made with pairs of crossing blades, each blade having to cut but half the width of the work being done may be operated with a great deal less power than if each blade had the whole width to cut, because each shaving of the half width has the whole space to get out and does not clog the cutter. I make each cutter of the same sectional profile for some distance back, as at its edge; for example, the profile 25, 28, being retained all the way from 26 to 27, so that if the cutter be sharpened by grinding its front face only, it will continue to produce the same shaped work as before sharpening.

The projecting boss 15, is particularly needed where large cutters are used, for by its aid, very little strain on the binding nut 11, is required to hold the largest cutters rigidly. Cutter-heads for this purpose have heretofore been formed with a plain shoulder, as shown at 29, Fig. 4, trusting entirely to the frictional grip of the nuts 11, and 12, to hold the cutters from slipping around the spindle 10.

It will be seen that cutters mechanically made as described, will always be in perfect balance, causing no vibration or jar by rapid rotation: also that there is no part to work loose and fly off to damage machinery or operator. There is no adjusting of blades required, as in the old style of flat blades screwed on to many-sided heads. Cutters shaped for any kind of work may be shifted, one for another, by merely unscrewing the nuts 11, 12.

These heads are light, inexpensive, and durable, and save a great deal of time of skilled workmen by being so readily set for work.

Having thus fully described my invention, what I believe to be new and desire to secure by Letters Patent, is the following:

1. In cutter heads and bits, a head having in one end a socket to fit upon a machine spindle, and reduced in diameter along the other end, forming a bit-carrying spindle; bits bored to fit upon this spindle and gained across their sides to fit together; a boss projecting from the shoulder beside the spindle and fitted to engage the gains in the bits; and binding nuts upon the spindle.

2. In cutter heads and bits, a head having a socket in one end, a spindle along its other end; a boss projecting at the shoulder beside the spindle, and bits gained in at their sides to fit together and to fit upon the said boss.

3. In cutter heads and bits, a head comprising a spindle and a larger shoulder at its base; a boss projecting from this shoulder, and bits gained in their faces to fit together and to fit upon the said boss, whereby the bits are locked directly to the shoulder to rotate therewith.

4. In cutter heads and bits, bits gained in their sides to fit together, and a head having a spindle to carry the bits, and a boss at the shoulder beside the spindle to engage any bit in its gained side.

In testimony whereof I affix my signature in presence of two witnesses.

ROBERT P. BIRDWELL.

Witnesses:
J. J. TERGESON,
W. B. WYATT.